US00RE40129E

(19) United States
(12) Reissued Patent
Warnagiris

(10) Patent Number: US RE40,129 E
(45) **Date of Reissued Patent: *Mar. 4, 2008**

(54) WIDE BANDWIDTH MULTI-MODE ANTENNA

(75) Inventor: Thomas J. Warnagiris, San Antonio, TX (US)

(73) Assignee: Southwest Research Insitute, San Antonio, TX (US)

( * ) Notice: This patent is subject to a terminal disclaimer.

(21) Appl. No.: 10/758,564

(22) Filed: Jan. 15, 2004

Related U.S. Patent Documents

Reissue of:
(64) Patent No.: 6,339,409
Issued: Jan. 15, 2002
Appl. No.: 09/768,433
Filed: Jan. 24, 2001

(51) Int. Cl.
*H01Q 1/36* (2006.01)

(52) U.S. Cl. ..... 343/895; 343/793
(58) Field of Classification Search ..... 343/793, 343/79.5, 796, 872, 895
See application file for complete search history.

(56) References Cited

U.S. PATENT DOCUMENTS

| | | | | | |
|---|---|---|---|---|---|
| 2,826,756 | A | | 3/1958 | Cary | 343/708 |
| 3,868,694 | A | | 2/1975 | Meinke | 343/753 |
| 4,148,030 | A | | 4/1979 | Foldes | 343/895 |
| 4,169,267 | A | * | 9/1979 | Wong et al. | 343/895 |
| 4,649,396 | A | * | 3/1987 | Friedman | 343/705 |
| 4,697,192 | A | * | 9/1987 | Hofer et al. | 343/895 |
| 5,216,436 | A | * | 6/1993 | Hall et al. | 343/895 |
| 5,349,365 | A | * | 9/1994 | Ow et al. | 343/895 |
| 5,479,182 | A | * | 12/1995 | Sydor | 343/895 |
| 5,668,559 | A | * | 9/1997 | Baro | 343/702 |
| 5,892,480 | A | * | 4/1999 | Killen | 343/385 |
| 6,150,984 | A | * | 11/2000 | Suguro et al. | 343/895 |
| 6,278,414 | B1 | * | 8/2001 | Filipovic et al. | 343/702 |
| 2006/0071873 | A1 | * | 4/2006 | Warnagiris | 343/895 |

FOREIGN PATENT DOCUMENTS

| | | |
|---|---|---|
| GB | 322614 | 12/1929 |

* cited by examiner

*Primary Examiner*—Tan Ho
(74) *Attorney, Agent, or Firm*—Baker Botts LLP

(57) ABSTRACT

A wideband multi-mode antenna having low VSWR operating characteristics. The antenna is has a shape similar to a helical antenna, but is formed from a right-triangularly shaped piece of conductive material. The result is a rolled planar antenna having a height and diameter predetermined to provide optimum VSWR for a given frequency range.

64 Claims, 5 Drawing Sheets

| FREQUENCY (MHz) | "FAT" MONOPOLE | | 3 TURN MONOPOLE | | UNROLLED | |
|---|---|---|---|---|---|---|
| | SIMULATED | MEASURED | SIMULATED | MEASURED | SIMULATED | MEASURED |
| 260 | 11.0 | 11 | 7.3 | 7.1 | 11.0 | 11.0 |
| 320 | 2.6 | 2.7 | 1.5 | 1.2 | 4.4 | 4.4 |
| 380 | 2.0 | 1.8 | 2.4 | 2.2 | 2.0 | 2.2 |
| 440 | 2.9 | 1.2 | 4.9 | 3.4 | 1.3 | 1.8 |
| 500 | 11.0 | 11.0 | 5.8 | 4.3 | 2.0 | 3.4 |
| 560 | 8.8 | 7.5 | 6.2 | 5.4 | 4.0 | 6.5 |
| 620 | 7.5 | 6.8 | 6.1 | 5.6 | 7.1 | 7.6 |
| 680 | 6.6 | 5.8 | 5.1 | 4.8 | 9.1 | 6.9 |
| 740 | 5.0 | 4.8 | 3.1 | 3.2 | 9.0 | 5.7 |
| 800 | 3.3 | 3.3 | 1.8 | 1.8 | 8.1 | 4.8 |

WIDE BANDWIDTH MULTI-MODE ANTENNA

Matter enclosed in heavy brackets [ ] appears in the original patent but forms no part of this reissue specification; matter printed in italics indicates the additions made by reissue.

TECHNICAL FIELD OF THE INVENTION

This invention relates to antennas, and more particularly to an antenna based on a tapered helix configuration and having low VSWR over a wide bandwidth, and multi-mode operation.

BACKGROUND OF THE INVENTION

Most antennas are capable of efficient operation over only a limited range of frequencies. For efficient energy radiation or reception, conventional antenna designs calls for antenna dimensions that are on the same order as the operating wavelength (λ). Efficient antenna operation requires not only efficient radiation or reception, the antenna must also be matched to the specific source or load for maximum energy transfer.

Antenna match quality is determined by the voltage standing wave ratio (VSWR) of the antenna at each frequency of interest. A perfect match requires a one-to-one ratio at all frequencies.

For broadband applications, there are several types of antennas that can be designed to provide a low VSWR over wide frequency ranges. Some of these antennas are inherently directional such as the conical spiral and log periodic. Others are omni-directional such as the bicone and tapered blade antennas.

Although there are a number of antenna configurations that can provide a low VSWR over a wide band, most have some limitations that make them unacceptable for many applications. For example, a log periodic antenna can easily be designed to provide low VSWR over several frequency octaves. But, the log periodic phase center, the effective radiating point of the antenna, varies with frequency and a log periodic is physically quite large compared to the wavelength of its lowest operating frequency. A bicone antenna or its monopole is capable of providing low VSWR over a wide bandwidth, but occupies a large volume compared to narrow band antennas having the same low end operating frequency. Generally, wideband antennas are difficult to design for low VSWR over more than an octave frequency range and are generally much larger than a wavelength at their lowest usable frequency.

Antenna, whether broadband or not, are not required to have low VSWR; many conventional antenna designs typically exhibit a high VSWR (>3:1). However, a high VSWR adversely affects efficiency, unless some form of compensatory matching network is used. But matching networks create new problems—most matching networks are not broadband and they tend to decrease the power available for transmission. For high power transmitters, matching networks must often be designed with electro-mechanical tuning elements. Such designs are costly and make automation of the matching function must slower than is possible with lower-power solid state tuning elements. In general, impedance matching to achieve a low VSWR is relatively easy for narrow band antennas (<10% of center frequency), but more difficult for wideband antennas (>20% of center frequency).

SUMMARY OF THE INVENTION

One aspect of the invention is a wideband multi-mode antenna. In its simplest form, the antenna is made from a single right triangularly shaped sheet of conductive material, having a height and a base dimension. The planar material is rolled, such that the antenna has the height of the planar material, a number of turns having spacing between them, a base diameter, and a pointed tip.

An advantage of the invention is that the antenna is compact, low cost, and easily manufactured. It provides a low VSWR that can be easily matched over a wide range of frequencies. With these features, the antenna has ready application to many existing systems as well as to new systems now under development for the wireless market. The potential for small size and wide bandwidth make the antenna especially useful for mobile communications and multi-mode radios.

DETAILED DESCRIPTION OF THE INVENTION

Overview of Structure and Operating Characteristics

Figure 1:
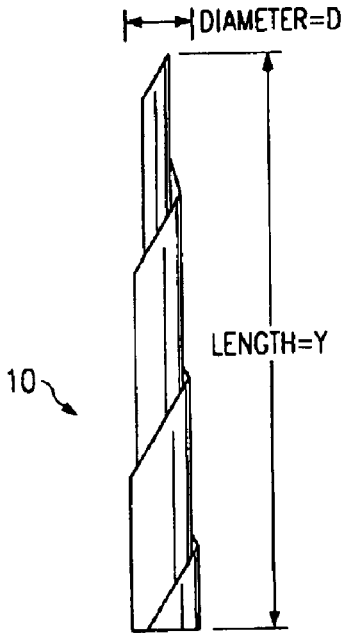
FIGS. 1 and 2 are a side view and a cross sectional view, respectively, of a wideband multi-mode antenna in accordance with the invention.
Figure 2:
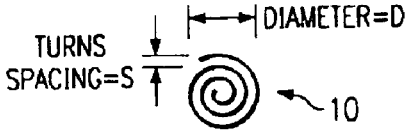
Figure 4:
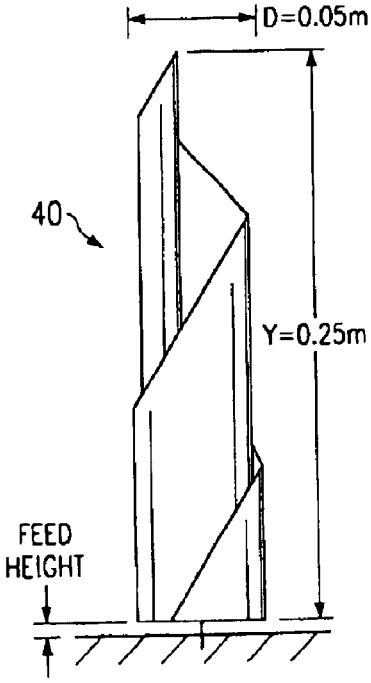
FIGS. 4 and 5 illustrate two turn configurations of the antenna.
Figure 5:
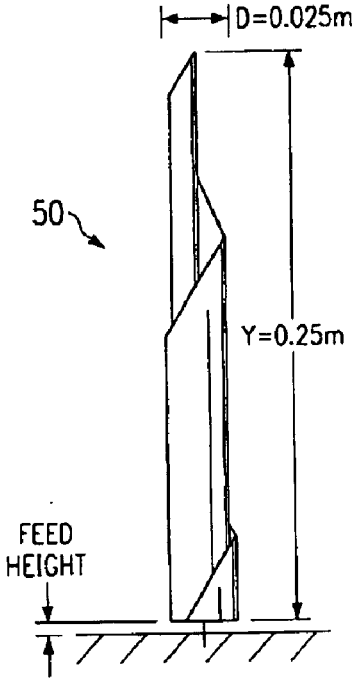
Figure 6:
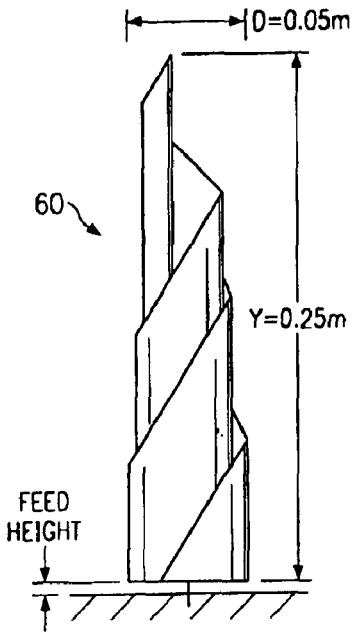
FIGS. 6 and 7 illustrate three turn configurations of the antenna.

FIGS. 1 and 2 are a side view and a cross sectional view, respectively, of a wideband multi-mode antenna 10 in accordance with the invention. As explained below, antenna 10 is a helical structure, formed from planar material. It exhibits a low VSWR over a wide frequency range. More specifically, antenna 10 has been demonstrated to provide less than 3:1 VSWR over an octave or more bandwidth. This low VSWR is easily matched to transmitters and receivers and associated devices.

Figure 3:
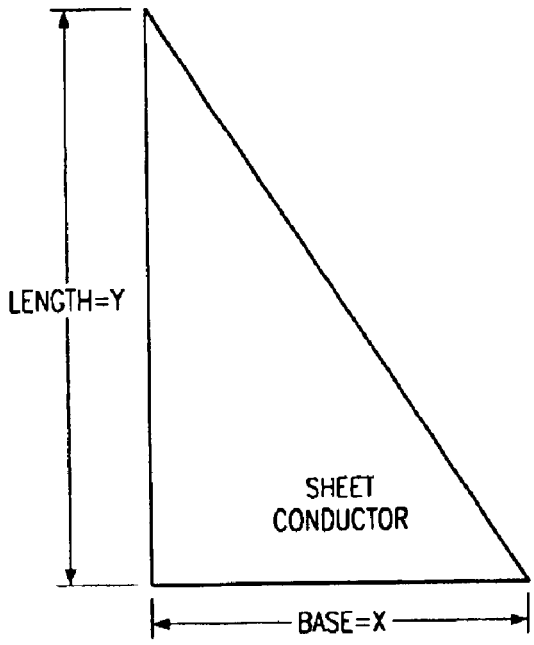
FIG. 3 illustrated the unrolled planar material used to construct the antenna of FIGS. 1 and 2.

As illustrated in FIG. 3, antenna 10 is constructed by rolling a right triangle shaped conductive material into a spiral having length Y and diameter D. Structurally, antenna 10 may be described as a tapered area small helix. An example of a suitable conductive material is 0.005 inch (0.127 mm) thick copper sheet.

Variations of antenna 10 may be constructed with triangularly shaped material, where the hypotenuse is curved (concave or convex) rather than straight. Mesh or grid material, having fine mesh or grid spacing has been shown to have equal performance especially when weight or wind loading are factors.

As further explained below, antenna 10 is electrically small. Its largest dimension (its height) is less than a wavelength at the lowest useful frequency (the frequency at which the VSWR rapidly improves). Dimension Y is typically about 0.2 to 0.24 λ at the lowest useful frequency.

Dimension D is typically about 0.02 λ at that frequency. Although in cross section, antenna 10 is not a true circle and tapers from base to tip, its diameter, D, is taken at the base and is approximated by twice the radius from the center to the outermost point on the antenna.

In operation, antenna 10 may be configured as a monopole and mounted above a conductive ground plane. However, antenna 10 may also be used as elements of other configurations, such as dipole antennas or antenna arrays.

Figure 7:
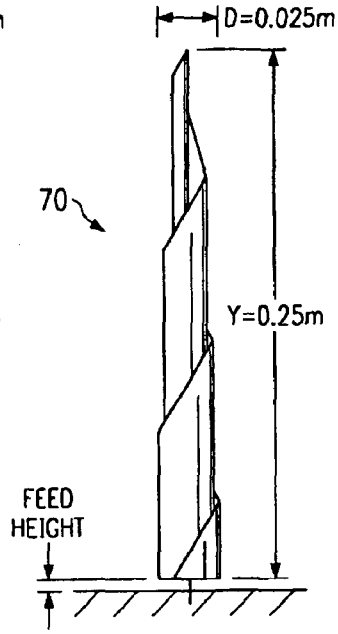
Figure 8:
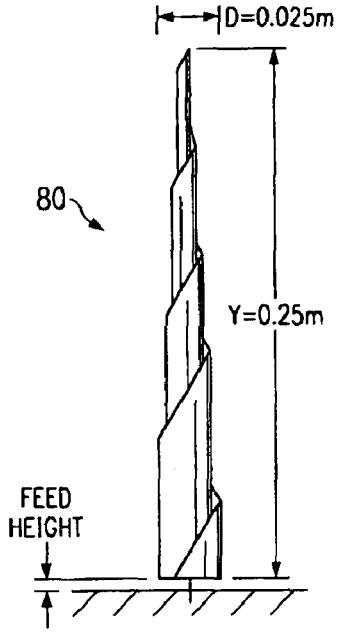
FIG. 8 illustrate a four turn configuration of the antenna.

FIGS. 4–8 illustrate various monopole configurations of antenna 10, including two, three, and four turn antennas. FIGS. 4–7 illustrates two and three turn antennas, 40, 50, 60, 70, with height to diameter ratios of 5:1 and 10:1, respectively. FIG. 8 illustrates a four turn antenna 80, with a height to diameter ratio of 10:1. For purposes of this description, references to antenna 10 are meant to include the variations depicted in FIGS. 4–8, unless the context indicates otherwise.

For performance evaluation purposes, antenna 10 may also be compared to a "fat" monopole, or a flat planar surface equivalent to an unrolled monopole. These configurations represent examples of rolled and unrolled limiting configurations of antenna 10. For example, a fat monopole approximates antenna 10 as the spacing between turns decreases to zero and the number of turns increases for a given base dimension.

Antenna Modeling for VSWR Characteristics

For computer-aided modeling of antenna 10, a suitable method is to use approximations to the antenna current distribution. This may be accomplished by using finite element methods, which break the planar surface into a large number of mathematically definable segments that approximate the surface. There are a number of methods for generating and solving a large number of segments.

Among the more popular computer-aided modeling methods is the method of moments (MoM). One example of a specific modeling tools using the MoM is GNEC-4, which is a Microsoft Windows compatible version of the basic NEC (Navel Electric Code) software. Analysis of Wire Antennas and Scatters (AWAS) is another example of MoM antenna simulation software.

For purposes of this description, antenna 10 and variations, were modeled to determine the effect of various parameters on VSWR, pattern, radiation efficiency, and electrical size. These parameters include:

Number of helical turns

Helical turns spacing

Ratio of height to helical diameter

Taper of planar material (from feed point to end)

Feed height above a ground plane

Planar material thickness

Variation in helical diameter from the bottom to the top of the antenna element

Simulations were used to establish a set of design guidelines, which are set out below. These guidelines include both general observations about the effects produced by parameter variation, as well as specific observations for design of a monopole antenna with at least one octave of low VSWR (<3:1) performance at radio frequencies from a few megaHertz to several gigaHertz.

Current distribution simulations demonstrate how the current distribution for each configuration changes as a function of frequency. For example, antenna 10, as compared to a "fat" monopole or unrolled version, has a better current distribution across a wider range of frequencies.

Multi-Mode Characteristics

A feature of all configurations of antenna 10, such as those of FIGS. 4–7, is that it has both linear and spiral surfaces continuously connected from the base of the antenna to the tip. A cross section of antenna 10 at any point from the base to the tip produces a spiral. This spiral shortens in length for cross sections taken closer to the tip. At the tip, the spiral reduces in length to a point. As explained below, this combination of linear and curvilinear surfaces produces multiple radiation modes which contribute both to low VSWR and differences in radiation polarization. Specifically, as described below, an antenna 10 has been tested that produces linear polarization near the first resonance, transitioning to axial mode circular polarization at frequencies where the circumference is greater than about 0.7 wavelengths.

In addition to VSWR simulations, antenna pattern simulations provide insight into the expected radiation pattern of antenna 10.

Figure 9:
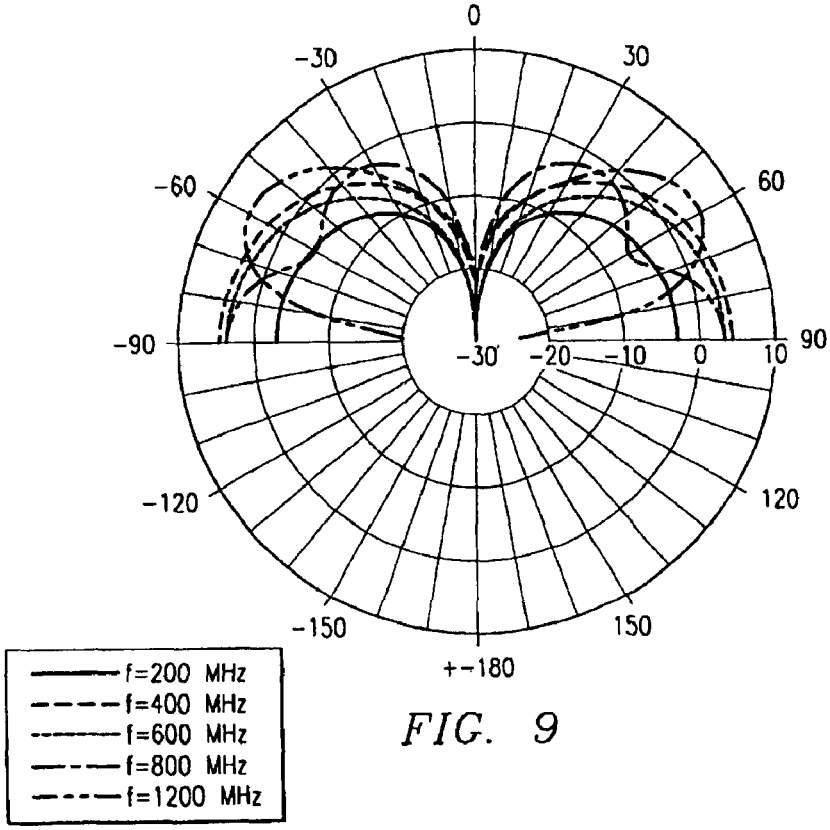
FIG. 9 illustrates the results of radiation pattern simulations of the antenna.

FIG. 9 illustrates the results of a simulation of polarization versus elevation angle for a three turn configuration of antenna 10, such as the configuration of FIG. 7. As illustrated, at lower frequencies, antenna 10 is omnidirectional, akin to a typical monopole. At higher frequencies, antenna 10 is more circularly polarized, akin to a helical antenna.

Simulated and Experimental VSWR Data

Figure 10A:
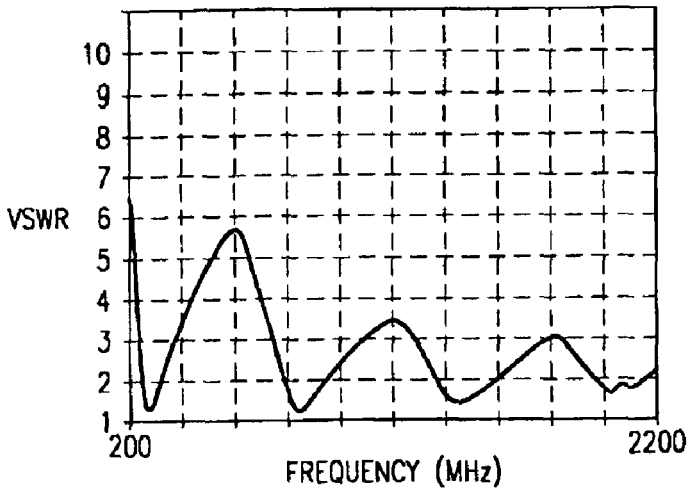
FIGS. 10A–10C illustrates measured VSWR data for fat monopole, unrolled, and three turn configurations of the antenna, respectively.
Figure 10B:
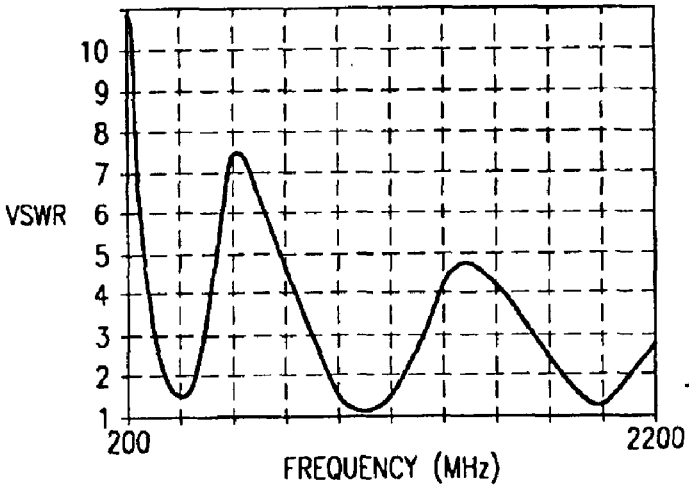
Figure 10C:
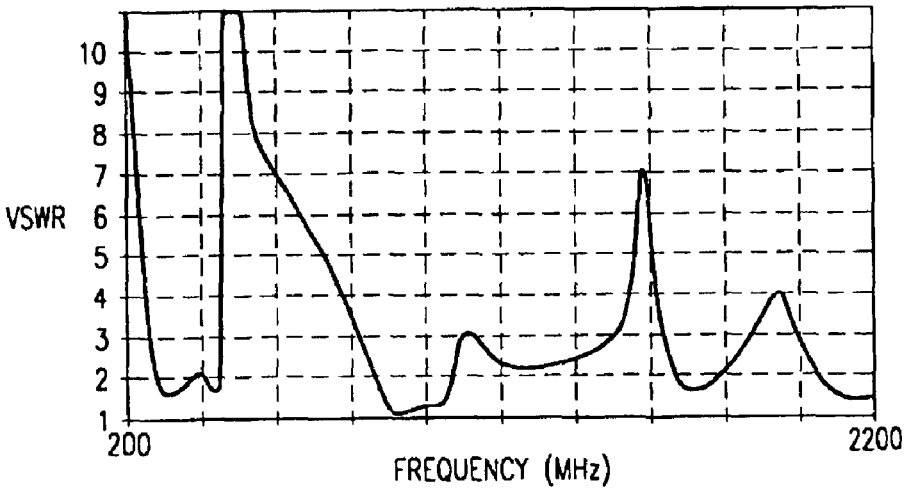

FIGS. 10A and 10B illustrate the VSWR performance of a 10:1 "fat" monopole and of an unrolled antenna, respectively. As stated above, these versions are represent two extremes of how the turns of antenna 10 may be configured. FIG. 10C illustrates the VSWR performance of a 10:1 three turn configuration of antenna 10, such as the embodiment of FIG. 7. For each figure, the frequency range is 200 to 2200 MHz.

Figures 11, 12:
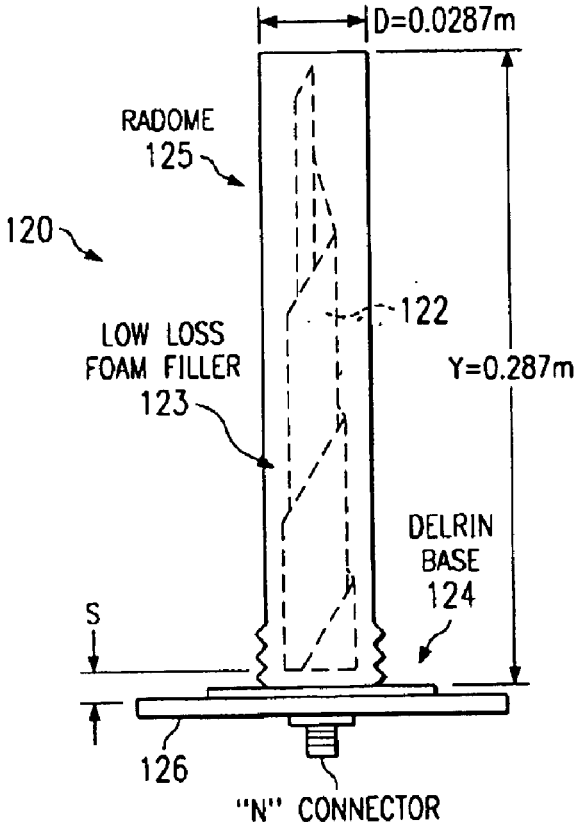
FIG. 11 compares measured versus simulated VSWR data for each of the configurations of FIGS. 10A–10C.
FIG. 12 illustrates the antenna with a radome and installed for use over a ground plane.

FIG. 11 illustrates the results of both computer simulated and experimental tests with real antenna configurations. Three configurations were tested: the fat monopole, a three turn antenna 70, and an unrolled antenna. For each configuration, the VSWR was both simulated and measured over a design bandwidth of 200 to 800 MHz.

An attempt was made to establish a rough numerical correlation by simplifying the data. Thus, FIG. 11 lists the VSWR data obtained by visually taking ten VSWR data points from each graph at equally spaced frequencies. From the data, the calculated correlation coefficient between simulated and measured data is 0.98 for antenna 70, 0.96 for the fat monopole, and 0.83 for the unrolled antenna.

The fact that it is possible to build antennas with such good correlation to simulation implies that it is relatively insensitive to small variation in physical dimensions (<1%). This is remarkable, because for a typical conical spiral antenna, a change of only 0.01 λ in the separation of spiral arms makes an essential difference in the observed RF current distribution.

Although VSWR performance of antenna 10, in its various configurations, is insensitive to small irregularities, there appear to be three critical physical parameters. These are the height to base ratio, the feed point height above the ground plane, and the turns spacing. Of these three parameters, only feed height above the ground plane may be difficult to control in field situations. The other two parameters are primarily a function of the antenna's fabrication accuracy. Turns spacing, as well as the number of turns, are functions of the unrolled surface horizontal dimension. Referring again to FIG. 3, this is the dimension labeled Base=X.

Design Guidelines

The following are design guidelines for monopole antennas. The guidelines are applicable to various configurations of antenna 10, such as the examples of FIGS. 4–8. The design objectives were to accommodate radio frequencies ranging from a few MHz to several GHz with low VSWR.

Monopole antennas with height to diameter ratios greater than 15:1 showed a general decrease in VSWR bandwidth improvement compared to a conventional monopole of the same diameter. Thus, antenna 10 should have a height to diameter ratio of 15:1 or less. A ratio of 1:1 should be considered a minimum; this ratio produces a structure similar to a spiral antenna above a ground plane.

The impedance and pattern characteristics of antenna 10 with a height to diameter ratio greater than 20:1 approaches that of an equivalent ratio monopole.

As the monopole height to diameter ratio decreases, the real and imaginary impedance as a function of frequency vary to a lesser degree.

Trading off low 50 Ohm VSWR against linear polarization bandwidth, it appears that monpoles with height to diameter ratios between 5:1 and 15:1 provide the most bandwidth with linear polarization while maintaining a useful VSWR (<3:1) bandwidth.

The spacing between the base of the antenna and the groundplane is a critical parameter. This seems reasonable when it is considered that closer spacing increases capacitive reactance and reduces inductive reactance. Placing the antenna base closer to the groundplane reduces both the real and imaginary part of the input impedance. By varying the spacing, the VSWR can be optimized for various operating impedances. For a 50 Ohm antenna, total length to spacing ratio on the order of 50:1 appears to be near optimum for a 10:1 height to diameter monopole.

At frequencies beyond one octave above the first resonance, the far field radiation pattern of the antenna, while still primarily omni-directional in azimuth, begins to develop lobes in the elevation pattern as well as axial mode circularly polarized radiation.

From initial resonance to approximately one octave above the initial resonance, the far field pattern of a monopole is effectively identical to that of a conventional monopole.

A lower height to diameter ratio provides less variation in the real impedance at frequencies above the first resonance. Therefore, a 5:1 ratio will provide less variation in VSWR over frequencies above the first resonance. The radiation mode of low ratio antennas may transition from linear to circular faster as frequency increases.

For low VSWR at frequencies within the first octave above the first resonance (zero imaginary impedance) the feed point should be on the antenna base at the inner most point of the turns. For best overall average VSWR at all frequencies above the first resonance the feed point should be half way along the spiral base.

The low frequency 2:1 VSWR cut off is nominally the frequency where the overall height (feed height plus element height) above the ground plane is 90% of a quarter wavelength at that frequency.

Concave tapering of the surface decreases the average VSWR without significantly decreasing the VSWR bandwidth.

The current distribution along an antenna element changes linear (along the length of the antenna) to circular (parallel to the ground plane) as the frequency is increased beyond an octave above the first resonance.

As the spacing between turns is increased, the VSWR bandwidth increases. Maximum spacing appears to provide the widest bandwidth above the first resonance, at the expense of increased VSWR within that frequency range.

Empirical tests indicate that dielectric material between the turns increases the capacitance between turns and is therefore somewhat equivalent to closer spacing of turns, and lower VSWR. Dielectric material may be used to control the spacing between turns, whether the spacing be uniform or varying.

The number of turns is not critical. The height to base ratio of the planar surface establishes the number of turns for a given base diameter and turns spacing.

For a monopole antenna having minimum size, the following are design parameters for providing low VSWR over an octave bandwidth:

The conductive material thickness should be less than 0.002 of the overall height H of the monopole so that it is effectively "thin" compared to the other antenna dimensions.

The unrolled planar material used to form the antenna should be cut as a right triangle with the height of the vertical axis Y determined by the low frequency f of the octave bandwidth. The vertical axis length Y should be determined by $Y=0.86(c/4f)$.

Where S is the spacing between the ground plane and the bottom of the monopole, typical ground plane to antenna spacing S should range between $S=Y/80$ to $Y/30$. Larger spacing increases both the real and imaginary impedance lower spacing reduces them. A good compromise value for S in a 50 Ohm system would be: $S=Y/50$. Overall height of the monopole above the groundplane is H where: $H=Y+S$.

The length of the horizontal axis X should be determined by $X=Y/K$, where K is a constant that can range from 1.3 to 1.7. The higher value for K will produce wider bandwidth, but higher average VSWR. The lower value will produce a narrower bandwidth, but lower average VSWR. A value of $K=1.6$ will produce a 2.5:1 VSWR octave bandwidth monopole.

Keeping the material spacing equal, turn the material to produce an antenna with maximum spiral diameter dimension D=of H/10. The number of total turns will be set by H and the value selected for K.

Reducing the spacing between turns narrows the VSWR bandwidth with minimal improvement in average VSWR. Maximum spacing between turns provides the widest VSWR bandwidth.

The feed point for maximum low VSWR bandwidth (one octave above the first resonance) is the innermost point of the base spiral.

The design guidelines set out above have been especially developed for a single octave antenna. However, with appropriate testing, wider bandwidths may be achieved. Notably, for certain values of K as the ratio of height to base decreases, the VSWR bandwidth widens to more than two octaves for VSWR less than about 3:1 with a 50 ohm reference.

With respect to feed points, different feed points along the spiral base change not only the VSWR bandwidth of the first resonance to second resonance of a monopole, but also the second resonance and higher resonance regions. With VSWR control techniques, such as shaping the hypotenuse of the planar surface, it may be possible to design a very broadband antenna or antenna with an useful frequency stop band (high VSWR region). Use of tunable feed points may yield a broadband antenna with a built-in tunable stop band filter. This could serve the interference mitigation purpose in the frequency domain that null-steering serves in the spiral domain.

Specific Design Parameters for 225 to 400 MHz Antenna

FIG. 12 illustrates an antenna 120 especially configured for the 225 to 400 MHz military communications band. The conductive material thickness used for antenna 120 is 0.005 inch (0.127 mm) thick copper sheet.

Unrolled planar material used to form the antenna was cut as a right triangle with the height of the vertical axis Y determined by the low frequency f of the desired bandwidth. Specifically, the vertical axis length Y is determined by Y=0.86(c/4f).For an f of 225 MHz the value for Y was 0.287 meters.

The base dimension X of the right triangle is determined by X=Y/K, where K can range from 1.3 to 1.7. Although less than a 3:1 VSWR octave bandwidth was desired, a value of K=1.6 was selected for mechanical design reasons.

Antenna 120 is mounted on a metal plate 126, which provides a ground plane. The ground plane to antenna spacing S ranges between S=Y/80 to Y/30. A good compromise value for S in a 50 Ohm system would be: S=Y/50. For example, a spacing S could be set at 0.0036 meters for an overall height H of the monopole above the ground plane of 0.293 meters.

The conductive material spacing was held equal as the material was rolled to produce an antenna with maximum (at the base) spiral diameter dimension of D=of H/10. In other words, the height to diameter ratio is 10:1. The number of turns is set by the H dimension and the value selected for K.

The feed point for maximum low VSWR bandwidth (one octave above the first resonance) is the innermost point of the base spiral.

The thin copper material selected for the antenna may be protected or supported by some form of mechanical support to produce a physically rugged antenna. In the example of FIG. 12, the antenna element 122 is mounted within a low loss radome 125, which stabilizes the turns spacing and provides a weather resistant shield. It may be made from a material, such as plastic tubing. The interior of the radome 125 is potted with a low loss dielectric foam filter 123, which fills the spacing between the turns of the antenna element 122. In the example of FIG. 12, the dielectric filler 123 also serves to hold the spacing between turns.

For a lower frequency range, a different construction technique could be more appropriate. For lower frequencies requiring larger antenna elements it would be possible to form the antenna surface from metal mesh supported by a rigid rod along the inside edge. Antennas of this type should be suitable for fixed locations. Wind loading could also be minimized by use of metal mesh.

For higher frequencies, the size of the antenna should be small enough that thin material (<0.2 mm thick) should provide enough rigidity so that foam potting would not be necessary.

As indicated in FIG. 12, antenna 120 is mounted on a delrin base 124. The use of such a base, which has a dielectric constant of 3.7, may add capacitance between the antenna element 122 and the ground plane 126. This effect may be alleviated by using lower dielectric constant material for the radome attachment point and spacing it further from the antenna element 122.

Figure 13:
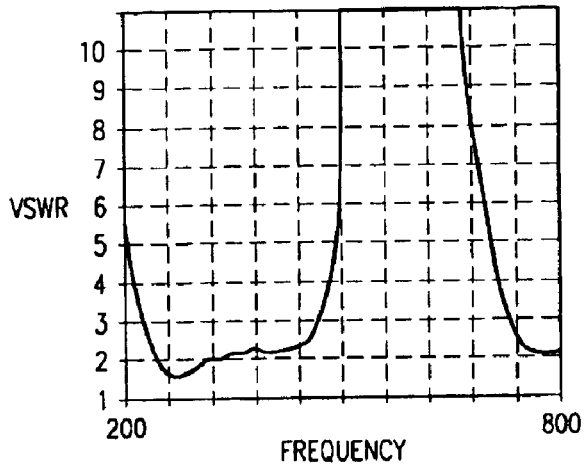
FIG. 13 illustrates the VSWR performance of the antenna of FIG. 12.

FIG. 13 illustrates the VSWR performance of antenna 120. As illustrated, antenna 120 provides a 3:1 VSWR bandwidth of more than 80% of the center frequency (see FIG. 61). Its volume is small compared to a conventional monopole—its base diameter is 10% of its height and it tapers to a point at its tip. Antenna 120 provides a superior VSWR bandwidth compared to any monopole within a volume equal or less than a TASH monopole.

Moreover, antenna 120 would not normally require a matching network. Essentially, it incorporates a matching network into the antenna configuration. The additional inductance and capacitance of the configuration is distributed in a manner that changes the current distribution on the antenna as a function of frequency. The change in current flow is complex and significantly different than current on a simple linear monopole of the same size. This change in distribution appears to provide additional VSWR bandwidth beyond what would be possible by simple impedance transformation matching networks applied to a conventional monopole.

In general, the above observations are true of the various configurations of antenna 10.

Impedance Characteristics

A fundamental difference between antenna 10 and conventional planar helical antennas is that the surface of antenna 10 has both a linear surface component along the antenna axis and a helical component around the antenna axis. This allows both linear and helical current to flow on the same structure. Planar and tapered surface helical antennas have only helical surfaces (no linear current flow), so current only follows a helical path.

Antenna 10 does not act like a large number of monopoles connected in parallel. It does provide multiple sheet current paths for signals applied at one point at its base. One dominant path is the straight path produced by the quarter wave resonance due to the vertical edge of the inside turn. Another dominant path is the resonant path produced by the outside spiral edge of the helix. When the feed point at the base is moved along the bottom spiral, an optimum VSWR point can be reached for an antenna having a given number of turns.

In simulations, there are similarities between the impedance of the "fat" monopole and unrolled versions of antenna 10 in monopole form. Specifically, except for much lower values of real and imaginary impedance both have the same form although the imaginary impedance of the unrolled version is more inductive (positive reactance). In contrast, for antenna 10 the real and imaginary impedance curves have an additional resonance. This additional resonance is apparently responsible for the partial cancellation of the normal monopole capacitive reactance while decreasing the value of the real impedance thus producing a wide VSWR bandwidth.

More Complex Configurations

Antenna arrays using monopoles or dipoles (yagi, planar array, corner reflector, etc.) as their fundamental elements may benefit by replacing conventional dipole/monopole elements with elements having the configuration of antenna 10.

Figure 14:
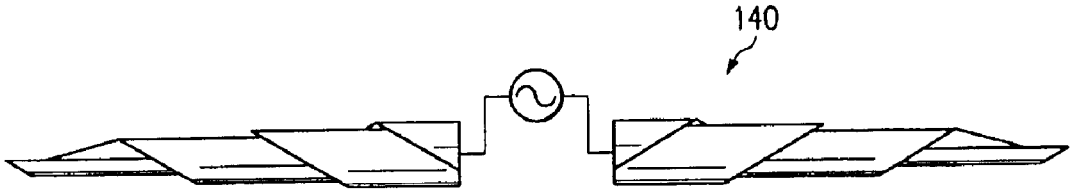
FIGS. 14 and 15 illustrate the antenna used as elements of a dipole configuration.
Figure 15:
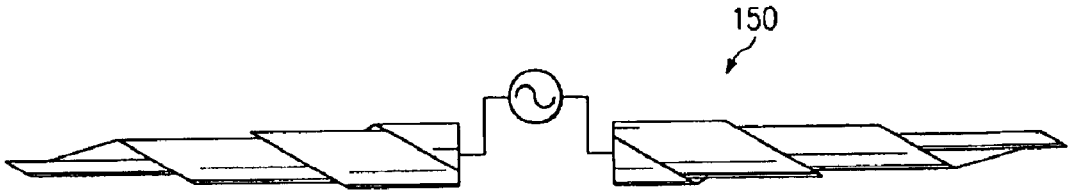

FIGS. 14 and 15 illustrate dipole antennas 140 and 150, respectively, in accordance with the invention. Antenna 140 is equivalent to a monopole above a ground plane. Antenna 150 is a reverse image version. Simulations indicate that antenna 150 has the same VSWR properties as antenna 140 except for the impedance at the first low impedance resonance. The radiation resistance is higher because the reverse image current do not cancel as they do in the conventional image represented by antenna 140.

As a fundamental antenna element, such as a loop or dipole, antenna 10 may be configured to form arrays. The resulting array provides a wider bandwidth than arrays comprised of conventional elements. When so mounted, VSWR may be easily referenced to a 50 ohm impedance system.

Other Embodiments

Although the present invention has been described in detail, it should be understood that various changes, substitutions, and alterations can be made hereto without departing from the spirit and scope of the invention as defined by the appended claims.

What is claimed is:

1. A wideband multi-mode antenna, comprising:

an antenna element made from a single right triangularly shaped sheet of conductive material, the material having a height and a base dimension;

wherein the conductive material has a rolled shape, such that the antenna has the height of the conductive material, a number of turns having spacing between them, *and* a base diameter[, and a pointed tip].

2. The antenna of claim 1, wherein the spacing between the turns is uniform.

3. The antenna of claim 1, further comprising a dielectric material between the turns.

4. The antenna of claim 1, wherein the ratio of the height to the diameter is less than 15:1.

5. The antenna of claim 1, wherein the ratio of the height to the diameter is greater than 5:1.

6. The antenna of claim 1, wherein the number of turns is less than four.

7. The antenna of claim 1, wherein the conductive material is a mesh material.

8. The antenna of claim 1, wherein the conductive material has a curved hypotenuse.

9. The antenna of claim 1, further comprising a radome enclosing the antenna element.

10. The antenna of claim 1, wherein the height is approximately in the range of 0.2 to 0.24 of the wavelength of a low frequency of operation.

11. The antenna of claim 1, wherein the diameter is approximately 0.02 of the wavelength of a low frequency of operation.

12. The antenna of claim 1, further comprising a ground plane upon which the antenna element is mounted.

13. The antenna of claim 12, wherein the spacing between the ground plane and the base of the antenna element results in a ratio of approximately 50:1, representing the ratio of total height of the antenna above the ground plane to the spacing.

14. The antenna of claim 1, wherein the height is approximately 0.86 times c divided by 4f, where f is a desired low frequency of operation.

15. The antenna of claim 1, wherein the base is approximately the height divided by K, where K is a constant ranging from 1.3 to 1.7.

16. The antenna of claim 1, wherein the thickness of the conductive material is less than 0.002 of the height.

17. The antenna of claim 1, further comprising a feed point at the innermost point of the base.

18. A diopole type antenna, comprising:

two antenna elements, each made from a single right triangularly shaped sheet of conductive material, having a height and a base dimension;

wherein the conductive material has a rolled shape, such that the antenna has the height of the conductive material, a number of turns having spacing between them, *and* a base diameter[, and a pointed tip];

wherein the antenna elements are connected to form a dipole.

19. The antenna of claim 18, wherein the antenna elements form mirror images.

20. The antenna of claim 18, wherein the antenna elements form reverse images.

21. A method of manufacturing an antenna, comprising the steps of:

forming a right-triangularly shaped sheet of conductive material, having a height and a base dimension; and rolling the material along the height dimension, to form the antenna such that the antenna has the height of the conductive material, a number of turns having spacing between them, *and* a base diameter[, and a pointed tip].

22. The method of claim 21, wherein the rolling step is performed such that the spacing between turns is uniform.

23. The method of claim 21, wherein the rolling step is performed such that the ratio of the height to the diameter is less than 15:1.

24. The method of claim 21, wherein the rolling step is performed such that the ratio of the height to the diameter is greater than 5:1.

25. The method of claim 21, wherein the height is approximately 0.86 times c divided by 4f, where f is a desired low frequency of operation.

26. The method of claim 21, wherein the base is approximately the height divided by K, where K is a constant ranging from 1.3 to 1.7.

27. The method of claim 21, wherein the thickness of the conductive material is less than 0.002 of the height.

28. The method of claim 21, wherein the forming step and the rolling step are performed to provide a height to diameter ratio that results in a desired VSWR.

29. The method of claim 21, further comprising the step of affixing an antenna feed point to the base of the antenna.

30. The method of claim 29, wherein the feed point is at the innermost point of the base.

31. The method of claim 29, wherein the feed point is placed at a location that produces a desired VSWR.

32. The method of claim 21, further comprising the step of adjusting the spacing between turns to provide a desired bandwidth.

33. The method of claim 21, further comprising the step of placing a dielectric material between the turns.

*34. A wideband multi-mode antenna, comprising:*

*a substantially triangular sheet of conductive material, rolled such that the material has one or more turns;*

*wherein the antenna has a height along the axis of the turns and a diameter determined by the outside surface of the turns; and*

*wherein the turns have spacing between them.*

*35. The antenna of claim 34, wherein the ratio of the height to the diameter is designed to provide a desired bandwidth.*

*36. The antenna of claim 34, wherein the height is designed to provide a desired operating frequency of the antenna.*

*37. The antenna of claim 34, wherein the diameter is designed to provide a desired operating frequency of the antenna.*

*38. The antenna of claim 34, wherein the height and diameter are designed to provide multiple operation modes of the antenna.*

*39. The antenna of claim 34, further comprising a ground plane, and further comprising a spacer between the antenna and the ground plane.*

*40. The antenna of claim 39, wherein the height of the spacer is designed to provide a desired bandwidth.*

*41. The antenna of claim 39, wherein the height of the spacer is designed to provide a desired operating frequency of the antenna.*

*42. The antenna of claim 39, wherein the height of the spacer is designed to provide multiple operation modes of the antenna.*

*43. The antenna of claim 34, wherein the spacing between the turns is designed to provide a desired bandwidth.*

*44. The antenna of claim 34, wherein the spacing between the turns is designed to provide a desired operating frequency of the antenna.*

*45. The antenna of claim 34, wherein the spacing between the turns is designed to provide multiple operation modes of the antenna.*

*46. The antenna of claim 34, wherein the feed point of the antenna is designed to provide a desired bandwidth.*

*47. The antenna of claim 34, wherein the feed point of the antenna is designed to provide a desired VSWR.*

*48. The antenna of claim 34, wherein the one or more turns have a linear upper surface.*

*49. The antenna of claim 34, wherein the one or more turns have an concave upper surface.*

*50. The antenna of claim 34, wherein the one or more turns have a convex upper surface.*

*51. A method of manufacturing an antenna, comprising the steps of:*

*rolling a sheet of generally triangular material, thereby forming a rolled shape having a height along the axis of the rolled shape, a diameter around the outer surface of the rolled shape, and one or more turns having spacing between them.*

*52. The method of claim 51, further comprising the step of adjusting the height of the planar material to provide a desired bandwidth.*

*53. The method of claim 51, further comprising the step of adjusting the height of the planar material to provide a desired operating frequency of the antenna.*

*54. The method of claim 51, further comprising the step of adjusting the height of the planar material to provide a combination of operating modes of the antenna.*

*55. The method of claim 51, further comprising the step of adjusting the diameter of the planar material to provide a desired bandwidth.*

*56. The method of claim 51, further comprising the step of adjusting the diameter of the planar material to provide a desired operating frequency of the antenna.*

*57. The method of claim 51, further comprising the step of adjusting the diameter of the planar material to provide a desired combination of operating modes of the antenna.*

*58. The method of claim 51, further comprising the step of placing the antenna above a ground plane, and of adjusting the spacing of the antenna above the ground plane to provide a desired bandwidth.*

*59. The method of claim 51, further comprising the step of placing the antenna above a ground plane, and of adjusting the spacing of the antenna above the ground plane to provide a desired operating frequency of the antenna.*

*60. The method of claim 51, further comprising the step of placing the antenna above a ground plane, and of adjusting the spacing of the antenna above the ground plane to provide a desired combination of operating modes of the antenna.*

*61. The method of claim 51, further comprising the step of adjusting the spacing between turns to provide a desired bandwidth.*

*62. The method of claim 51, further comprising the step of adjusting the spacing between turns to provide a desired operating frequency of the antenna.*

*63. The method of claim 51, further comprising the step of adjusting the spacing between turns to provide a desired combination of operating modes of the antenna.*

*64. The method of claim 51, further comprising the step of adjusting the feedpoint of the antenna to provide a desired bandwidth.*

* * * * *